No. 896,161. PATENTED AUG. 18, 1908.
D. E. ROSS.
CHANGE SPEED DEVICE.
APPLICATION FILED NOV. 6, 1905.

2 SHEETS—SHEET 1.

WITNESSES: David E. Ross. INVENTOR.
BY Fouts & Hull
ATTORNEYS.

No. 896,161.  
D. E. ROSS.  
CHANGE SPEED DEVICE.  
APPLICATION FILED NOV. 6, 1905.

PATENTED AUG. 18, 1908.

2 SHEETS—SHEET 2.

WITNESSES:  
David E. Ross INVENTOR.  
BY Fouts & Hull  
ATTORNEYS.

UNITED STATES PATENT OFFICE.

DAVID E. ROSS, OF BROOKSTON, INDIANA.

CHANGE-SPEED DEVICE.

No. 896,161.　　　　Specification of Letters Patent.　　　Patented Aug. 18, 1908.

Application filed November 6, 1905. Serial No. 286,015.

*To all whom it may concern:*

Be it known that I, DAVID E. ROSS, residing at Brookston, in the county of White and State of Indiana, have invented a certain new and useful Improvement in Change-Speed Devices, of which the following is a full, clear, and exact description, reference being had to the accompanying drawings.

This invention relates to change of speed devices, or to devices wherein the driven member may be caused to rotate at any desired speed, although the driving member is driven at a constant speed. In my invention, the change is so gradual that, with the driving shaft running at a high and constant speed, the driven member may be entirely at rest, or its speed may be increased until it equals that of the drive shaft, throughout which range of speed there will be no perceptible jerk.

Figure 1:
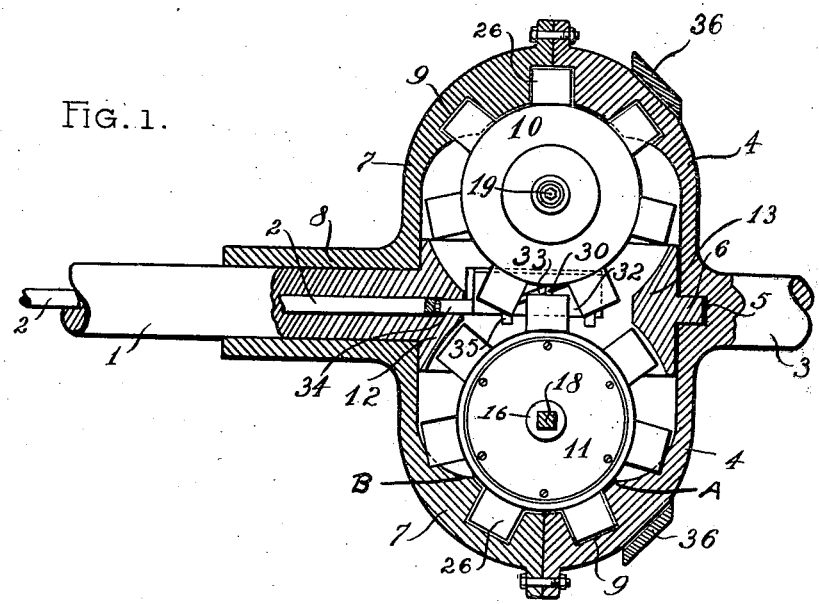
Figure 2:
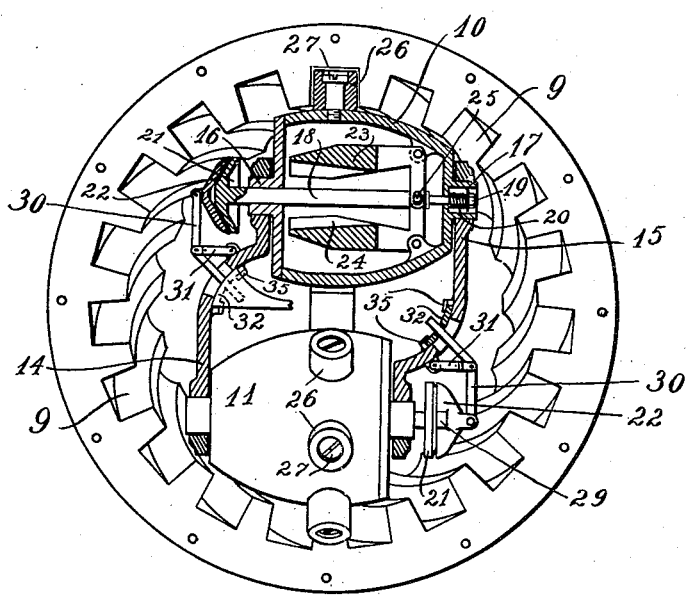
Figure 3:
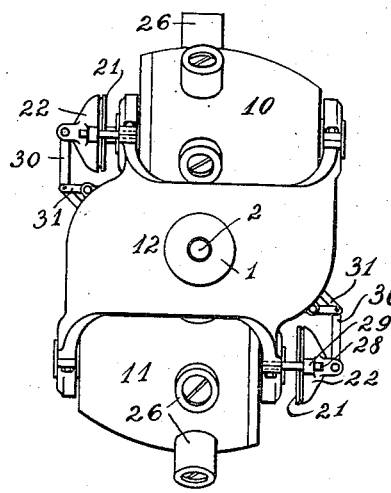
Figure 4:
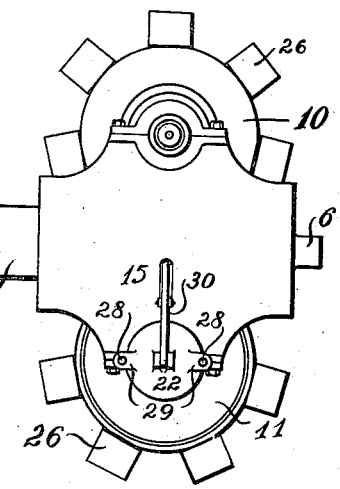
Figure 5:
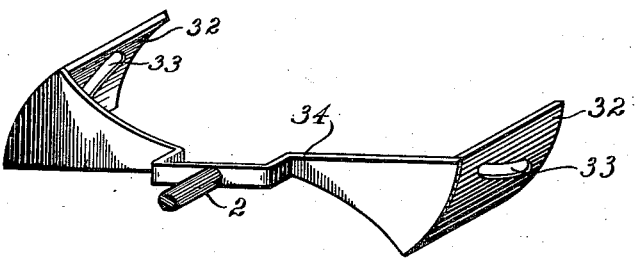

In the drawings forming part of this application:—Figure 1 is a longitudinal section through the center of the gear casing, showing the driving drums in end elevation, parts of the frame carrying the drums being cut away; Fig. 2 is a view looking to the right in Fig. 1 with the left-hand side of the casing removed, the frame for the drums and also one of the drums being shown in section;
Fig. 3 is an end elevation of the drums and the frame therefor, looking at the same from the direction of the drive shaft, the outer casing being removed; Fig. 4 is a side elevation of the parts shown in Fig. 3; and Fig. 5 is a perspective view of the cam plates for controlling the friction disks that regulate the speed of the driven shaft.

In my invention, the drive shaft is intended to be driven at a constant speed, as all explosive engines have their greatest efficiency when driven at the speed for which the engine is especially designed. The mechanism connecting the drive and driven shafts is controlled by friction devices, arranged within the casing, whereby the driven shaft may remain entirely idle, as when the friction devices are thrown out of engagement, or it may be driven with the speed of the drive shaft or at any intermediate speed desired by simply regulating the degree of friction in the said connecting mechanism. As will be understood from a more extended description of said devices, the friction produced does not represent loss of power, inasmuch as it simply represents more torque applied to the driven shaft.

Referring, now, to the drawings, in which similar reference characters designate corresponding parts throughout the several views, 1 represents the drive shaft, the end of which, next the change speed device, is hollow for the reception of the clutch controlling rod 2, hereinafter more fully described.

3 is the driven shaft which, as shown, is coaxial with the drive shaft. The drive shaft is, of course, driven by a suitable motor, not shown, and the driven shaft is connected with the device that is to be driven from the motor. That end of the driven shaft toward the drive shaft is provided with a shell 4, which forms half of the casing for the connecting mechanism; and at the center of said shell it is provided with a socket 5, said socket forming a journal for the adjacent end 6 of the drive shaft. The opposite side of the casing is formed of a shell 7, similar to shell 4, said shells being secured together at their peripheries, and forming a closed casing for the connecting mechanism. The shell 7 is provided with a sleeve extension 8, that projects in the direction of the drive shaft, which sleeve, in connection with the socket 5, forms a bearing for said drive shaft. The inner surfaces of the two shells, which shells will hereinafter be referred to as the "casing", is provided with grooves or threads 9 which are arranged spirally within the casing similar to screw threads with a long pitch, the angle of said grooves with respect to the shafts varying with conditions, but being preferably from five to ten degrees. These grooves arranged in this manner are clearly shown in Fig. 2 of the drawing; and from Fig. 1 it also appears that they extend from that part of the casing at A to a part at B.

The inner end of the drive shaft is provided with a frame for carrying the intermediate drums 10 and 11, said drums being journaled in the frame. This frame consists of end pieces 12 and 13, and side pieces 14 and 15. These drums, 10 and 11, as appears from Fig. 2, are hollow, and at their ends are provided with trunnions 16 and 17 which are journaled in the sides 14 and 15, respectively, of the frame, the trunnion 17 being made hollow, for a purpose hereinafter set forth. Extending through the center of each drum is a squared shaft 18, one end of which passes through a squared opening in the trunnion 16, Fig. 1, said opening fitting the said shaft so as to compel the shaft to turn with the drum. The opposite end of the shaft is preferably rounded, and it projects through a comparatively thin wall in the trunnion 17 and into the hollow of said trunnion. A nut 19 is screwed upon the end of the shaft, so as to compress between itself and the said wall of the trunnion a coiled spring 20, said spring forcing the nut away from the said wall and carrying the shaft with it. The opposite, or squared end of the shaft is provided with a friction disk 21, that is adapted to engage with a complemental friction disk 22, said latter disk being held from rotation by suitable means hereinafter described. These disks, therefore, constitute a yielding clutch.

Pivoted to the inner walls of the drums 10 and 11 are governor weights 23 and 24, said weights being preferably of bell-crank form, having their longer and weighted ends extending in the direction of the shaft 18 and their shorter ends engaging, by a pin and slot connection 25, with said shaft. The spring 20 holds the weighted parts of the bell cranks normally toward the shaft; but, as the drums rotate, as hereinafter described, the weights will be thrown outwardly against the tension of the spring, said movement of the weights carrying the shaft laterally and causing the friction disk 21 to engage with the disk 22.

The drums 10 and 11 are each provided with radially projecting rollers 26, which travel in the grooves 9 within the casing. These rollers, rather than plain pins, are employed for the purpose of avoiding friction. As shown, the rollers are secured to the drums by means of shoulder screws 27, upon which screws the rollers are to rotate.

From this description it will be understood that as the drive shaft is rotated the drums will be revolved in an orbit thereabout; and if the casing is held from rotation, the screw-threaded grooves therein, engaging with the rollers 26, will cause the drums to rotate on their trunnions. Owing to the long pitch of the grooves, a slow rotation of the drive shaft will cause a relatively rapid rotation of the drums when the casing is stationary. It will also be understood that if the drums are prevented from rotating within the casing, then the rollers on the drums and the grooves within the casing form a positive and unyielding clutch connection between the drive shaft and the driven shaft whereby the two shafts will turn at the same speed.

In order to secure intermediate speeds, I arrange to control the degree of friction between the disks 21 and 22, which is accomplished by moving the disk 22 back and forth with respect to the rotary disk 21. The said disk 22 is, therefore, mounted to slide upon pins 28, which project from the sides 14 and 15 of the drum frame, said disk being provided with lugs 29 for the reception of the pins. For moving the disk upon the pins, a lever 30 is provided, said lever being pivoted at its center to a link 31 that is connected at its opposite end to the drum frame. One of the ends 7 of the lever 30 is pivoted to the disk 22, and the other end is adapted to be swung in and out by a cam plate 32, shown in perspective in Fig. 5. As there are two friction disks 22, there must also be two levers 30 and two cam plates 32. These cam plates are provided with cam slots 33, through which the levers 30 project, (see Fig. 1). The cam plates are joined together by a plate 34, to the center of which the end of the brake-controlling rod 2 is connected, and said plates are guided to slide within the drum frame by guides 35. The rod 2 is moved back and forth by hand, through any suitable mechanism, not shown. The required amount of friction between the disks 21 and 22 can be secured by properly sloping the frictional surfaces thereof. As shown, the disk 21 is of conical shape, while the disk 22 is hollowed to conform thereto. The action of the governor weights 23 is also controlled by the nut 19, which can be screwed on or off the shaft 18 to regulate the tension of the spring 20.

While my invention may be used in many relations, so that I do not desire to confine the same to any particular art, it is especially adapted for use in automobiles employing explosive engines; and I will therefore describe its operation when thus used. Said operation is as follows:—We will assume that in the beginning the automobile is standing at rest with the engine running at normal speed. Under these conditions the casing is stationary while the drums revolve therein, which revolution causes said drums to rotate on their trunnions at a high rate of speed. The friction disks 21 and 22 are also practically out of engagement, which permits the drums to rotate freely, although the weights 23 are thrown outwardly to substantially their fullest extent. By moving the rod 2 inwardly, the disks 22 are simultaneously moved toward their coöperating disks 21, and friction is applied which tends to hold the drums from rotating, and to start the casing and the drum shaft; and as soon as sufficient friction is thus applied, the casing will begin to turn and the automobile will start slowly. At this time the drums will still be rotating at a comparatively high rate of speed; but, by increasing the friction between the disks, this speed may be cut down and the speed of the vehicle increased as desired until the drums are entirely held from rotation, at which time the driven shaft is turned at its maximum speed.

Assuming next that the automobile is being driven along at a certain speed and a hill is reached. This will naturally check the speed of the casing. But, as a result, the speed of the drums will be increased, which will cause the weights 23 to fly outwardly and thus increase the friction between the disks, which will increase the torque in the driven shaft, and cause the vehicle to mount the hill with but little diminution of speed, provided the engine is capable of handling the increased load, and in case the engine is not equal to the additional load, the operator may give a greater reduction by use of operating rod. To hold the vehicle while descending a hill, a brake 36, Fig. 1, may be applied to the outside of the casing in any well-known manner.

As will be understood, but one of the drums 10 or 11 may be employed, although I prefer to use two or more in order that the mechanism may be balanced. The joint between the sleeves 8 and the drive shaft is sufficiently tight to prevent the leakage of oil with which the casing may be filled.

Changes may be made in the specific arrangement of parts in my invention without departing from the spirit thereof. For example, the casing may be attached to the drive shaft 1 in which case the drums would be carried by the driven shaft. I may also arrange the grooves within the casing so as to pass around the same in planes at right angles to the shaft, in which case the grooves would simply be in parallel planes and would not be spirally arranged. In order to coöperate with said grooves the axes of the drums would be placed at an angle to the planes of the grooves. As this is a simple reversal of the grooves and axles already shown, an illustration thereof is not deemed necessary.

Having thus described my invention what I claim as new and desire to secure by Letters-Patent is:—

1. In a change speed device, a drive shaft, a driven shaft, a member carried by one of said shafts, said member having a grooved surface on its interior, a rotatable device secured to the other shaft within the said member, said device having projections for engaging with the grooves in said member, and means coöperating with said device for controlling the rotation thereof, whereby the relative speeds of the shafts are regulated, substantially as described.

2. In a change speed device, a drive shaft, a driven shaft, a member carried by one of said shafts, said member having a grooved surface, a frame carried by the other shaft, a drum journaled in said frame, said drum having projecting portions for engaging with the grooves in said members, a friction device carried by said drum, a friction device carried by said frame, and means for moving one of said friction devices relatively to the other, whereby the speed of the drum is controlled, substantially as described.

3. In a change speed device, a drive shaft, a driven shaft, a casing moving with one of said shafts, said casing being provided with grooves, a rotatable member carried by the other shaft and having projecting portions for traveling in said grooves, and means for controlling the rotation of said member whereby the power transmitted to the driven shaft is controlled, substantially as described.

4. In a change speed device, a drive shaft, a driven shaft, a member moving with one of said shafts, said member being provided with spirally arranged grooves or threads, a rotatable device carried by the other shaft and having projecting portions for traveling in said grooves, a friction device for controlling the rotation of said rotatable device, and means for regulating said friction device, substantially as described.

5. In a change speed device, a drive shaft, a driven shaft, a casing moving with one of said shafts, said casing being provided with spirally arranged grooves or threads, a frame carried by the other shaft, a drum journaled in said frame and having projecting portions for traveling in said grooves, a friction device for controlling the rotation of said drum, and means for regulating the friction in said device, substantially as described.

6. In a change speed device, a drive shaft, a driven shaft, a casing moving with one of said shafts, said casing being provided with spirally arranged grooves or threads, a frame carried by the other shaft, a drum journaled in said frame and having projecting portions for traveling in said grooves, a friction device for controlling the rotation of said drum, and a centrifugal governor connected with said drum for regulating the friction device, substantially as described.

7. In a change speed device, a drive shaft, a driven shaft, a casing moving with one of said shafts, said casing being provided with spirally arranged grooves or threads, a frame carried by the other shaft within said casing, a rotatable device journaled in said frame and having its axis in a plane perpendicular to the drive shaft, said rotatable device having projecting portions for traveling in said grooves, and means for controlling the rotation of said device, substantially as described.

8. In a change speed device, a driving member, a driven member, a casing moving with one of said members, said casing having an engaging surface within said casing, mechanism moving with the other member and engaging said surface, a friction device interposed in said mechanism, and means for controlling the friction of said device, whereby the relative rates of speed of said members is regulated, substantially as described.

9. In a change speed device, a drive shaft, a driven shaft coaxial therewith, a casing connected with one of said shafts and turning therewith, said casing having grooves in its interior surface, a sleeve projecting from said casing through which the other shaft extends and in which it is journaled, a frame mounted on the end of said other shaft within the casing, a rotatable device mounted in said frame and having projecting portions engaging with said grooves, and means for controlling the rotation of said device, substantially as described.

10. In a change speed device, a drive shaft, a driven shaft coaxial therewith, a casing connected with one of said shafts and turning therewith, said casing having grooves on its interior surface, a sleeve projecting from said casing through which the other shaft extends and in which it is journaled, a frame mounted on the end of said other shaft within the casing, a pair of rotatable drums journaled in said frame, said drums having projecting portions engaging with the grooves in said casing, shafts projecting through said drums and carrying friction surfaces, governor weights connected with said drums and their shafts for moving the shafts laterally as the rotation of the drums vary and non-rotatable friction devices for engaging with said friction surfaces, substantially as described.

11. In a change speed device, a drive shaft, a driven shaft coaxial therewith, a casing connected with one of said shafts and turning therewith, said casing having grooves in its interior surface, a sleeve projecting from said casing through which the other shaft extends and in which it is journaled, a frame mounted on the end of said other shaft within the casing, a rotatable drum mounted in said frame and having projecting portions engaging with said grooves, and a centrifugal governor and brake connected with said drum for controlling the rotation thereof, substantially as described.

12. In a change speed device, a drive shaft, a driven shaft, a casing connected with one of said shafts and turning therewith, said casing having grooves in its interior surface, a frame mounted on the end of the other shaft within the casing, the end of said other shaft next the frame being hollow, a rod extending through the hollow of said shaft into the interior of the casing, a rotatable drum mounted in said frame and having projecting portions engaging with the grooves in the casing, said drum also having a friction surface turning therewith, and means controlled by said rod for engaging with said friction surface to control the rotation of said drum, substantially as described.

13. In a change speed device, a drive shaft, a driven shaft coaxial therewith, a casing connected with one of said shafts and turning therewith, said casing having spirally arranged grooves in its interior surface, a sleeve projecting from said casing through which the other shaft extends and in which it is journaled, a frame mounted on the end of said other shaft within the casing, said shaft adjacent the frame being hollow, a rod extending through said hollow into the interior of the casing, a rotatable drum mounted in said frame and having projecting portions engaging with said grooves in the casing, said drum also having a friction surface turning therewith, and means controlled by said rod for engaging with said friction surface whereby the speed of rotation of said drum is controlled, substantially as described.

14. In a change speed device, a drive shaft, a driven shaft, a casing moving with one of said shafts, said casing being provided with spirally arranged grooves or threads, a frame carried by the other shaft within said casing, a drum trunnioned in said frame and having projecting portions for traveling in said grooves as the frame rotates, a friction disk mounted to revolve with said frame, governor weights mounted to rotate with the said drum, and a second friction disk rotating with the drum, the said weights controlling the position of the second friction disk with respect to the other friction disk, substantially as described.

15. In a change speed device, a drive shaft, a driven shaft, a casing moving with one of said shafts, said casing being provided with spirally arranged grooves or threads, a frame carried by the other shaft, a drum trunnioned in said frame and having projecting portions for traveling in said grooves as the frame revolves, a shaft passing through the trunnions in said drum and carrying on one of its ends a friction disk, governor weights mounted within the drum and connected with the shaft passing therethrough, said weights causing the shaft to move longitudinally as the speed of rotation of the drum varies, and a friction disk mounted on the frame to coöperate with the friction disk on the drum shaft, substantially as described.

16. In a change speed device, a drive shaft, a driven shaft, a casing moving with one of said shafts, said casing being provided with spirally arranged grooves or threads, a plurality of drums journaled in said frame and each having projecting portions for traveling in said grooves, said drums being mounted on opposite sides of the drive shaft so as to balance one another as they revolve with the frame, and means for controlling the rotation of said drums, whereby the relative speeds of rotation of the drive shaft and driven shaft may be controlled, substantially as described.

17. In a change speed device, a drive shaft, a driven shaft, a casing moving with one of said shafts, said casing being provided with spirally arranged grooves or threads, a frame carried by the other shaft within said casing, a pair of rotatable drums journaled in said frame and having their axes in a plane substantially perpendicular to the drive shaft, said drums having projecting portions for traveling in said grooves, and means for controlling the rotation of said drums, substantially as described.

18. In a change speed device, a drive shaft, a driven shaft, a casing moving with one of said shafts, said casing being provided with spirally arranged grooves or threads, a frame carried by the other shaft within said casing, a pair of rotatable drums journaled in said frame and having their axes in a plane substantially perpendicular to the drive shaft, said drums having projecting portions for traveling in said grooves, and centrifugal governors and brakes connected with said drums for controlling the rotation of the same, substantially as described.

19. In a change speed device, a drive shaft, a driven shaft, a casing moving with one of said shafts, said casing being provided with grooves on its interior, a frame carried by the other shaft within said casing, a rotatable device journaled in said frame and revolving therewith, said device having projecting portions for traveling in said grooves, a friction member rotating with said device, a non-rotatable friction disk mounted on said frame, and means for moving said disk with respect to the friction member, whereby the rotation of said rotatable device is controlled, substantially as described.

20. In a change speed device, a drive shaft, a driven shaft, a casing turning with one of said shafts, said casing being provided with grooves on its interior surface, a frame carried by the other shaft within said casing, rotatable drums journaled within said frame, said drums having projecting portions for engaging with the grooves in the casing, friction members turning with said drums, non-rotatable friction disks carried by said frame, means for moving the said non-rotatable friction disks with respect to the friction members, whereby the speed of the rotation of the said drums is controlled, substantially as described.

21. In a change speed device, a drive shaft, a driven shaft, a casing connected with one of said shafts and turning therewith, said casing having grooves on its interior surface, a frame mounted on the end of the other shaft, a rotatable device journaled in said frame, said device having projecting portions engaging with the grooves on the casing, a friction member carried by said device, a coöperating friction member mounted in said frame, a cam plate also mounted in said frame, connections between said cam plate and said coöperating member, and means for moving said cam plate, substantially as described.

22. In a change speed device, a drive shaft, a driven shaft, a casing connected with one of said shafts and turning therewith, said casing having grooves on its interior surface, a frame mounted on the end of the other shaft within the casing, said other shaft being hollowed adjacent said frame, a drum journaled in said frame, said drum having projecting portions engaging with the grooves in said casing, a friction member turning with said drum, a coöperating friction member carried by said frame, a rod passing through the hollow of said other shaft, a cam plate connected with said rod, and means connecting the cam plate with said coöperating friction member whereby the speed of rotation of said drum is controlled, substantially as described.

23. In a change speed device, a drive shaft, a driven shaft co-axial therewith, a casing connected with one of said shafts and turning therewith, said casing having grooves on its interior surface, a sleeve projecting from said casing through which the other shaft extends and in which it is journaled, a frame mounted on the end of said other shaft within the casing, a plurality of rotatable drums journaled in said frame, said drums having projecting portions engaging with the grooves in said casing, shafts projecting through said drums and carrying friction surfaces, governor weights connected with said drums and their shafts for moving the shafts laterally as the rotation of the drums vary, non-rotatable friction devices mounted on the frame and adapted to coöperate with the friction surface carried by the drums, and means for moving said non-rotatable friction devices toward and from said friction surface, substantially as described.

24. In a change speed device, a drive shaft, a driven shaft coaxial therewith, a casing connected with one of said shafts and turning therewith, said casing having spirally arranged grooves on its interior surface, a sleeve projecting from said casing through which the other shaft extends and in which it is journaled, a frame mounted on the end of said other shaft within the casing, said other shaft being hollow adjacent said frame, a rod passing through said hollow into the interior of said casing, rotatable drums journaled in said frame, said drums having projecting portions engaging with the grooves in said casing, shafts projecting through said drums and carrying friction surfaces, governor weights connected with said drums and their shafts for moving the shafts laterally as the rotation of the drums vary, a friction device carried by said frame for engaging with said friction surfaces, cam plates mounted on said frame and connected with said rod, and means connecting said cam plates with the said friction devices to cause the same to advance or recede from the friction surfaces, substantially as described.

In testimony whereof I affix my signature in the presence of two witnesses.

DAVID E. ROSS.

Witnesses:
LYNN H. BORDNER,
T. A. WILSON.